United States Patent [19]

Butler

[11] Patent Number: 4,972,582
[45] Date of Patent: Nov. 27, 1990

[54] NOTCH FOR ALIGNING INSULATION CUTTERS

[75] Inventor: John D. Butler, Germantown, Wis.

[73] Assignee: Mechtrix Corporation, Menomonee Falls, Wis.

[21] Appl. No.: 196,677

[22] Filed: May 20, 1988

[51] Int. Cl.⁵ .............................................. B21F 13/00
[52] U.S. Cl. .................................... 30/90.1; 81/9.51; 140/139
[58] Field of Search .................... 30/90.1; 81/9.51; 140/139, 140

[56] References Cited

U.S. PATENT DOCUMENTS

| | | | |
|---|---|---|---|
| 4,009,738 | 3/1977 | Baba et al. | 81/9.51 X |
| 4,577,405 | 3/1986 | Butler | 30/90.1 |
| 4,784,024 | 11/1988 | Butler | 81/9.51 |

Primary Examiner—Frank T. Yost
Assistant Examiner—Willmon Fridie, Jr.
Attorney, Agent, or Firm—Fuller, Ryan & Hohenfeldt

[57] ABSTRACT

Blades for cutting and stripping insulated electrical conductors have alignment references thereon for aiding the set-up and adjustment of the blades. The alignment references comprise corners across the longitudinal edges of the blades. Each corner is formed by the intersection of the longitudinal edge and a first leg that is machined into the longitudinal edge and extends toward the blade interior. A second leg extends between the first leg and the longitudinal edge to create a generally V-shaped notch in the blade longitudinal edge. The first leg preferably intersects the longitudinal edge at a right angle to provide a sharp corner line. The second leg preferably intersects the longitudinal edge at an angle of less than about 45 degrees, thereby producing a rather blunt corner and permitting easy differentiation between the two corners.

27 Claims, 2 Drawing Sheets

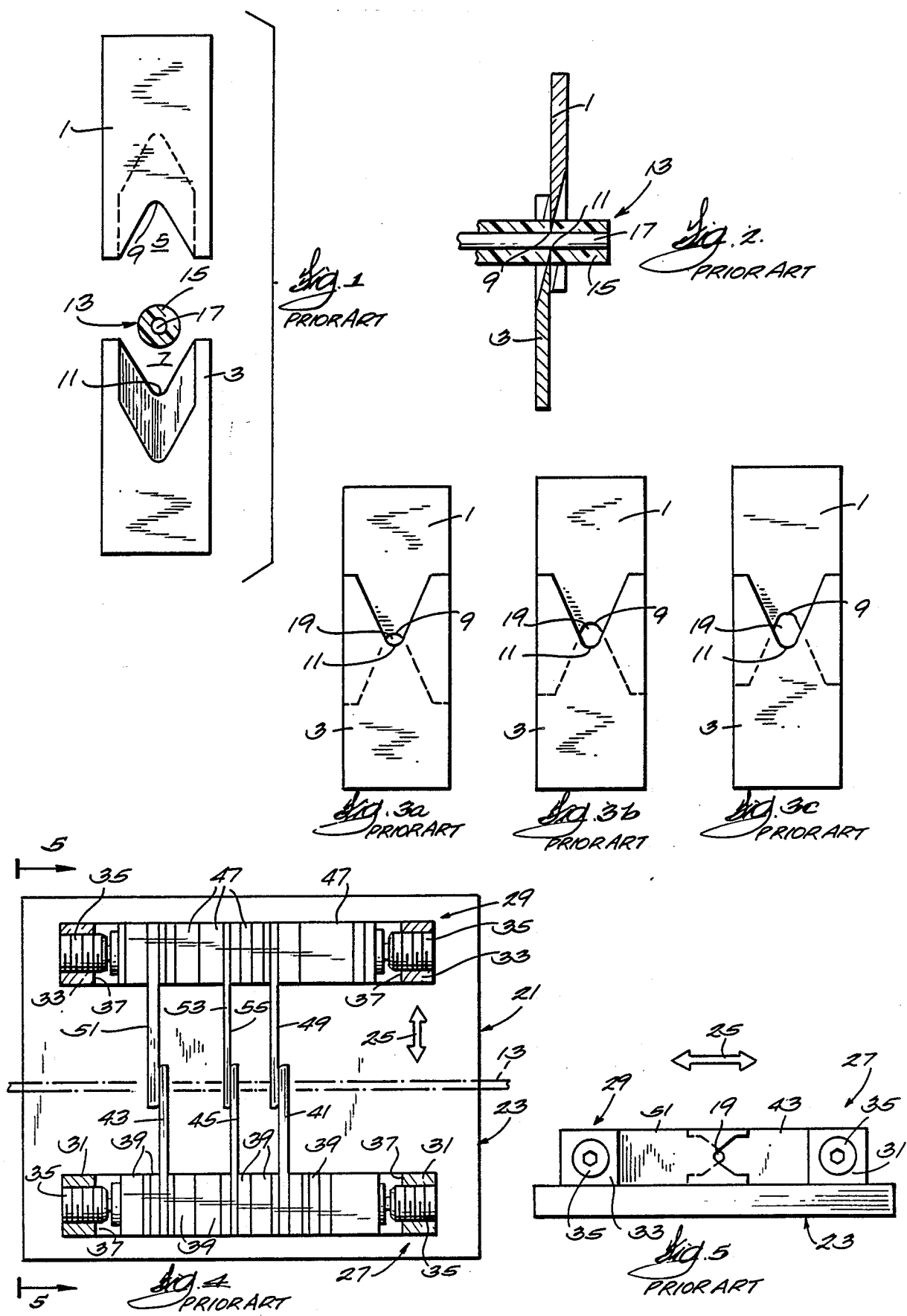

4,972,582

NOTCH FOR ALIGNING INSULATION CUTTERS

BACKGROUND OF THE INVENTION

1. Field of the Invention

This invention pertains to stripping insulation from insulated electrical conductors, and more particularly to apparatus for accurately positioning insulation cutoff and stripping blades for optimal stripping performance.

2. Description of the Prior Art

Machines for cutting and stripping insulation from insulated electrical conductors are well known, as are the cutoff and stripping blades used in the machines. For example, U.S. Pat. No. 4,577,405, the disclosure of which is incorporated herein by reference, describes compound angle blades for stripping electrical conductors. My U.S. Pat. No. 4,784,024 describes tooling for holding cut-off and stripping blades in an appropriate machine.

Referring to FIGS. 1 and 2, a pair of prior stripping blades 1 and 3 are illustrated that have generally V-shaped openings 5 and 7, respectively. Cutting edges with radii 9 and 11 are machined into the interior ends of each V-shaped opening 5 and 7, respectively. When the blades 1 and 3 are placed in facing relationship as shown in FIG. 1 and brought together in bypassing fashion, the cutting edges 9 and 11 cooperate to form a nearly round hole. When closed over an insulated conductor 13, the blades cut the insulation 15 thereon without damaging the conductor 17.

As discussed in U.S. Pat. No. 4,577,405, the V-type cutting blades 1 and 3 can strip a number of sizes of insulated electrical conductor 13 by varying the size of the hole formed by the mating blade cutting edges 9 and 11. Hole size variation is a result of the bypassing nature of the blades. The hole size is controlled by the relative positions of the blades at the end of the closing stroke. It is important to note that there is only one relative position of the cutting blades at which the cutting hole is optimally round. Turning to FIGS. 3a-3c, closing the blades down to the position shown in FIG. 3a, or opening the blades up to the position of FIG. 3c, from the optimal round hole of FIG. 3b results in an increasingly less circular hole 19.

Since there is a single position of the blades 1 and 3 that form an optimally round hole 19, it is desirable to pre-set the blades in the cutting machine such that the optimal hole is automatically formed at the end of the closing stroke. If necessary, minor final adjustments can be made after a sample insulated electrical conductor 13 is stripped. A visual inspection of the stripped insulated electrical conductor will indicate whether the blade hole must be slightly opened up or closed down from the initial setting.

Looking at FIGS. 4 and 5, a typical stripping and cutting station 21 of an insulated conductor processing machine is illustrated. The cutting and stripping station 21 includes a conventional machine frame schematically illustrated at 23. Mounted on the frame 23 for relative transverse reciprocation in the directions of arrow 25 is a front tool holder 27 and an independent rear tool holder 29. Each tool holder 27 and 29 includes a pair of longitudinally spaced apart upstanding shoulders 31 and 33, respectively. The shoulders 31 and 33 are threaded to receive set screws 35 or similar fasteners. Mounted between the respective inside faces 37 of the shoulders are a series of spacers and blades. The front tool holder carries spacers 39 together with prior stripping blades 41 and 43 and a cut-off blade 45. In applications that call for only one end of an insulated conductor piece 13 to be stripped of insulation 15, only one stripping blade, 41 or 43, is employed.

The rear tool holder 29 carries spacers 47 together with stripping blades 49 and 51 and a cut-off blade 53. The pairs of stripping blades 41, 49 and 43, 51 are located with respect to each other such that as the front and rear tool holders 27 and 29, respectively, reciprocate transversely in the directions of arrow 25, the stripping blades close over and slice the insulation of the insulated electrical conductor 13, which lies perpendicular to the direction of blade motion. Simultaneously, the cut-off blades 45 and 53 cooperate to sever the insulated conductor along line 55. Subsequent longitudinal motion of the closed stripping blades relative to the fixed insulated conductor pulls the cut lengths of insulation from the inner conductor.

In the set-up of FIGS. 4 and 5, there is no marking, reference, or indication that would aid the machine operator to pre-set the prior blades 43, 51 and 41, 49 at the desired optimum position for cutting the insulation or to make subsequent minor adjustments to the pre-set position. In most cutting and stripping machines commonly used in the industry, it is virtually impossible to view the blade hole 19 from a perspective such as is shown in FIGS. 3 and 5. Therefore, the machine operator has no idea what the actual hole size will be when he installs the tool holder/blade assemblies into the machine tooling station 21. Accordingly, it is highly desirable that an alignment reference of some type be incorporated into the cut-off and stripping blades.

To be useful, any alignment reference must meet several important functional criteria. The alignment reference must be very accurately located on the blades. Many stripping applications require stripping insulation 15 having a wall thickness of only about 0.01 inches. Therefore, the location of the alignment reference must be within a few thousandths of an inch of the desired nominal location. The thickness and edge definition of the alignment reference are also critical, since accuracy to within a few thousandths of an inch is required.

The alignment reference must be consistently located on the various cut-off and stripping blades. As shown in FIG. 4, six blades are used in a typical set up (four stripping blades 41, 43, 49, and 51 and two cut-off blades 45 and 53). The blades are manufactured, shipped, and selected at random for use in machine set ups. Accordingly, to be useful, any alignment references must be precisely located.

The alignment reference must also be a permanent part of the blades. Blades are handled many times between manufacture and use in a cutting and stripping machine. Further, the blades are used in rather harsh environments. The action of lubricants and other chemicals must be considered in connection with the type of alignment reference applied to the blades.

The alignment reference must lend itself to be easily and inexpensively applied on a production basis. Cut-off and stripping blades are perishable tools, and they are used in highly cost sensitive markets. A difference of only a few cents per blade will often determine industry acceptance of the blades.

It is conceivable that alignment marks might be placed on the longitudinal edges of the blades 41, 43, 49, and 51, since the longitudinal edges of the installed blades are normally viewable by the operator. However, scribing or etching reference lines is not only difficult to accomplish, but also such lines do not meet several of the criteria mentioned previously. For example, simply scribing a thin line on the blade would require a tolerance of the line width, narrow as it might be. The clarity of both edges of the line would have to be very distinct.

Thus, a need exists for means that facilitate the installation and set up of cut-off and stripping blades on insulated electrical conductor processing machines.

SUMMARY OF THE INVENTION

In accordance with the present invention, blades for cutting and stripping insulated electrical conductors are provided that are accurately locatable relative to each other in conductor processing machinery. This is accomplished by apparatus that includes sharp alignment corners on the blades.

An alignment corner is formed in at least one longitudinal edge of each blade of a cooperating pair. The corner is preferably created by the intersection of the blade longitudinal edge with the first leg of a V-shaped notch cut into the blade longitudinal edge. It is preferred that the notch first leg is perpendicular to the blade longitudinal edge. The corner of the blade edge and the notch first leg forms a sharp line across the blade edge that is very accurately locatable relative to the blade radius cutting edge. The corner line serves as an alignment reference for blade set up in cutting and stripping machines.

The second leg of the V-shaped notch makes an angle of less than 90 degrees with the blade longitudinal edge. The angle of the second notch leg creates a rather blunt corner at the intersection of the second leg with the blade longitudinal edge. The difference in corner line sharpness provides a clear indication of which corner line across the blade is to be used as the alignment reference.

The alignment reference formed by the sharp corner between the notch first leg and the blade longitudinal edge has no thickness. The corner line therefore provides an excellent indication to the machine operator for positioning the blade in his machine.

Since cut-off and stripping blades are used in pairs, the associated longitudinal edges of each blade of a pair are formed with alignment references. It is preferred that the notches lie side by side in the pair of blades. The notch alignment corners are then easily viewable by the machine operator, and he can readily see the effects of relative blade movement when a pair is being set up or adjusted. Alignment of the blades— hidden cutting edges is thus quickly and accurately accomplished by moving one or both blades until the sharp corners of the respective blades are visually observed to lie along a common line.

Other advantages and features of the invention will become apparent to those skilled in the art upon reading the disclosure.

BRIEF DESCRIPTION OF THE DRAWINGS

FIG. 1 is a front view of typical insulation stripping blades.

FIG. 2 is a longitudinal cross-sectional view of the stripping blades and insulated electrical conductor of FIG. 1.

FIGS. 3a–3c are simplified front view of typical stripping blades in different operating positions.

FIG. 4 is a top view of a typical tooling station on a machine for cutting and stripping insulated electrical conductors.

FIG. 5 is a view taken along lines 5—5 of FIG. 4 and rotated 90 degrees counterclockwise.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 6A:
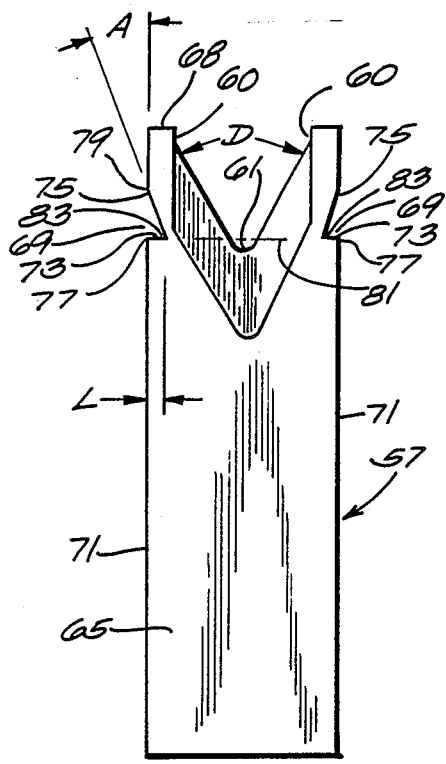
FIGS. 6a and b are front views of the stripping blades according to the present invention.
Figure 6B:
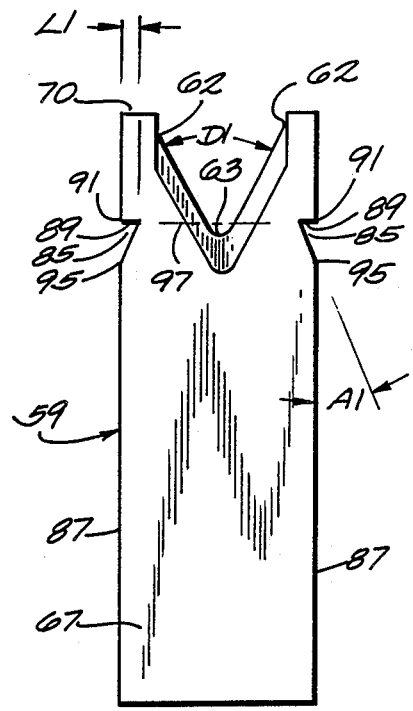

Referring to FIGS. 6a and b, pair of stripping blades 57 and 59 are illustrated that include the present invention. The particular blades 57 and 59 shown have a single angle D and D1, respectively, between the edges 60 and 62 that form extensions of the respective cutting radii 61 and 63. However, it will be understood that the invention may also be applied to blades having other cutting edge configurations, such as compound angle blades described in U.S. Pat. No. 4,577,405.

The blades 57 and 59 are used together in bypassing pairs in tool holders of conventional insulated electrical conductor processing machines. For example, the blades are suitable for use in the tool holders 7 and 9 as described herein in connection with FIGS. 4 and 5. The blades have respective shank ends 65 and 67 that are gripped firmly in the tool holders, such as by spacers 39 and 47 and fasteners 35 of FIGS. 4 and 5.

In accordance with the present invention, blade 57 is manufactured with an alignment reference in the form of a sharp corner line 77 in at least one longitudinal edge 71. Preferably, an alignment reference 77 is formed in both longitudinal edges 71. The alignment corner is created by the intersection of the first leg 73 of a notch 69 cut into the blade longitudinal edge. The notch 69 also has a second leg 75. The first leg 73 constitutes a surface that is preferably perpendicular to the surface of the longitudinal edge 71, thereby forming the sharp corner line 77 across the thickness of the blade. The leg 75 constitutes a surface that intersects the blade edge 71 at an angle A of less than 90°. While almost any angle A less than 90° is satisfactory, it is desirable that the angle A be less than approximately 45°, so as to create a rather blunt second corner 79. To easily distinguish between the corners 77 and 79, it is preferred that the angle A be approximately 10 degrees. Notch 69 has the second leg thereof lying between the first leg and the blade leading end 68.

The alignment reference corner 77 is very accurately located relative to the radius cutting edge 61. Although not necessary, it is convenient that the plane of the surface of leg 77 be coincident with the transverse center line 81 of the cutting edge radius 61.

The length L of the notch first leg 73 is not critical. A length L of approximately 0.03 inches to 0.04 inches is satisfactory. Since only the corner between the notch first leg and the blade longitudinal edge 71 serves as the alignment reference, the configuration of the bottom of the notch is not critical. For ease of manufacture, a relatively large radius of approximately 0.015 inches at the bottom of the V-notch is permissible.

In blade 59, a notch 85 is cut into at least one and preferably both longitudinal edges 87. Each notch 85 has a first leg 89 defined by a surface perpendicular to the blade edge 87. As a result, a sharp corner line 91 is created at the intersection of the first leg 89 and the blade edge 87. The second leg of the notch 89 is a surface 93 that forms an angle A1 with the blade edge 87 and that intersects the notch first leg. Like angle A of blade 57, the angle A1 of blade 59 is relatively shallow, preferably making an angle of approximately 10 degrees relative to the edge 87. A blunt corner 95 across the blade thickness is thus formed at the junction of the blade longitudinal edge surface and the notch second leg. In blade 59, the notch second leg lies between the notch first leg and the blade shank end 67. The plane of the notch first leg is preferably coincident with the transverse center line 97 of the blade cutting edge radius 63.

Figure 7:
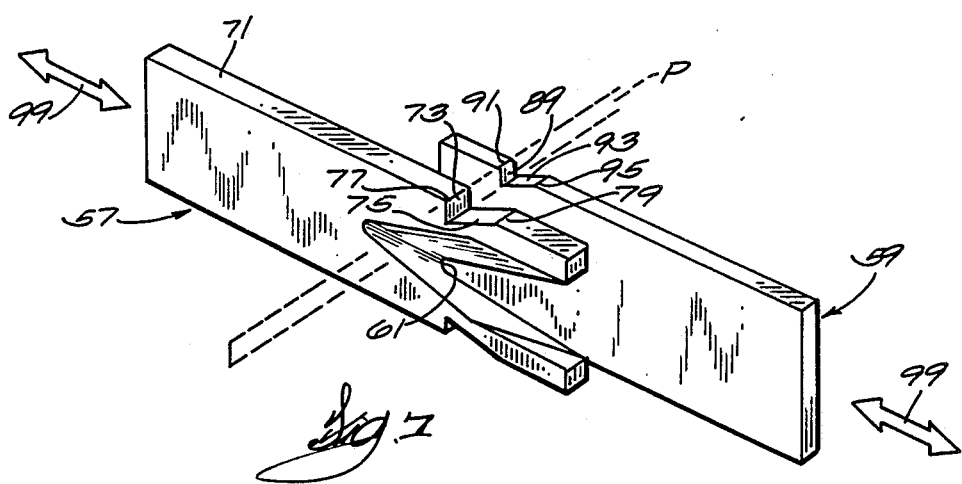
FIG. 7 is a perspective view of a pair of aligned stripping blades in accordance with the present invention.

Operation of the blades 57 and 59 and the function of the respective notches 69 and 85 are illustrated in FIG. 7. Blade 57, which is sometimes called the long blade, is placed adjacent and in operative relation to the blade 59, which is sometimes called the short blade, in normal fashion. For clarity, in FIG. 7 the blades are shown with a transverse spacing therebetween, but in practice the blades are in facing contact, as is known in the art. Also for clarity, the tool holders for clamping and positioning the blades within the insulated electrical conductor processing equipment are omitted in FIG. 7. The tool holders reciprocate the blades in opposite directions, as is indicated by arrows 99, in conventional fashion.

The notches 69 and 85 play an important role during the initial set up and subsequent adjustment of the blades 57 and 59 in the machine tool holders. The blades are longitudinally pre-set such that their sharp corner lines 77 and 91 of the notches 69 and 85, respectively, are colinear at the end of the blade cutting strokes. Simultaneously, surface 73 of the notch first leg on the blade 57 lies in a common plane P with the surface 89 of the notch first leg on blade 59. Such pre-setting is performed very accurately and quickly because of the properties of the sharp alignment corner lines. Since the corner lines have no thickness tolerance to consider, they provide excellent clarity for the machine operator, which contributes to their suitability as alignment references.

Thus, it is apparent that there has been provided, in accordance with the invention, insulation cutting and stripping blades having alignment references that fully satisfy the aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim:

1. A blade for cutting and stripping insulated electrical conductors comprising a member formed as a rectangular parallelopiped having first and second opposed longitudinal edges and opposed shank and leading ends, the leading end being formed with an opening defined by a pair of edges that converge toward the interior of the member and that terminate in a radius cutting edge having a transverse center line perpendicular to the member longitudinal edges and adapted to partially surround an insulated electrical conductor to transversely cut the insulation thereon, at least one longitudinal edge being formed with a notch defined by a first leg that extends from the longitudinal edge toward the member interior and a second leg that extends between the notch first leg and the longitudinal edge, the intersection of the longitudinal edge and the notch first leg forming a first corner across the longitudinal edge, so that the corner between the notch first leg and the blade longitudinal edge is suitable as an alignment reference for pre-setting the blade in insulated electrical conductor processing machinery.

2. The blade of claim 1 wherein the notch first leg makes an angle of substantially 90 degrees with the member longitudinal edge to thereby form a sharp first corner line across the member longitudinal edge.

3. The blade of claim 2 wherein the plane of the notch first leg and the radius cutting edge transverse center line coincide.

4. The blade of claim 2 wherein the notch second leg makes an angle of less than approximately 45 degrees with the blade longitudinal edge to thereby form a relatively blunt second corner across the member longitudinal edge that is visually distinguishable from the first corner line.

5. The blade of claim 1 wherein the notch second leg is located between the notch first leg and the member leading end.

6. The blade of claim 1 wherein the notch second leg is located between the notch first leg and the member shank end.

7. The blade of claim 1 wherein both longitudinal edges are formed with notches defined by respective first legs extending from the respective longitudinal edges toward the member interior and respective second legs that extend between the respective first legs and the respective longitudinal edges.

8. The blade of claim 7 wherein:
   a. the notches first legs make an angle of substantially 90 degrees with the respective longitudinal edges to thereby form respective sharp first corners across the member longitudinal edges; and
   b. the notch second legs make an angle of less than approximately 45 degrees with the respective blade longitudinal edges to thereby form respective blunt second corners across the longitudinal edge that are visually distinguishable from the respective first corners.

9. The blade of claim 7 wherein the planes formed by the first legs of the respective notches coincide.

10. The blade of claim 9 wherein the member radius cutting edge transverse center line coincides with the plane formed by the first legs of the respective notches.

11. The blade of claim 7 wherein the second leg of the notches in each longitudinal edge is locate between the notch first leg and the member leading end.

12. The blade of claim 7 wherein the second leg of the notch in each longitudinal edge is located between the notch first leg and the member shank end.

13. Apparatus for circumferentially cutting insulation of an insulated electrical conductor comprising first and second cutting blades formed as respective rectangular parallelopipeds having first and second opposed longitudinal edges and opposed shank and leading ends, the leading ends being formed with respective openings defined by a pair of edges that converge toward the interior of the parallelopiped and that terminate in respective radius cutting edges having transverse center lines perpendicular to the respective blade longitudinal edges, the blades being arranged in facing relationship with the respective cutting edges thereof being substantially co-planar, the blades being oppositely reciprocable to a closed position wherein the radius cutting edges cooperate to form a cutting circle to circumferentially cut the insulation, at least one of the longitudinal edges of each blade being formed with a notch defined by a first leg that extends from the respective longitudinal edge toward the respective cutting blade interior and a second leg that extends between the notch first leg and the longitudinal edge, the intersection of the respective longitudinal edges and notch first legs forming a corner across the longitudinal edge, so that the respective blade corners serve as alignment references to facilitate setting the blades to form a cutting circle for cutting the insulation.

14. The apparatus of claim 13 wherein:
a. the first legs of the respective notches of the first and second cutting blades make an angle of approximately 90 degrees with the respective blade longitudinal edges to thereby form sharp first corner lines across the blade longitudinal edges; and
b. the second legs of the respective notches of the first and second cutting blades make an angle of less than approximately 45 degrees with the respective blade longitudinal edges to thereby form relatively blunt second corners that are visually distinct from the respective first corners, so that the respective sharp first corner lines serve as the alignment references for setting the first and second cutting blades relative to each other.

15. The apparatus of claim 14 wherein the planes of the first legs of the notches and the transverse center lines of the radius cutting edges of the respective cutting blades coincide.

16. The apparatus of claim 13 wherein:
a. the notch second leg of the first cutting blade is located between the notch first leg and the blade leading end; and
b. the notch second leg of the second cutting blade is located between the notch first leg and the blade shank end, so that the notches of the two blades are aligned when the respective notch first legs are aligned.

17. The apparatus of claim 13 wherein both longitudinal edges of each cutting blade are formed with notches defined by respective first legs extending from the respective longitudinal edges toward the cutting blade interior and respective second legs that extend between the respective first legs and the longitudinal edges.

18. In a cutting blade formed as a rectangular parallelopiped having first and second opposed longitudinal edges and opposed shank and leading ends, the leading end being formed with an opening defined by a pair of edges that converge toward the interior of the parallelopiped and that terminate in a radius cutting edge having a transverse center line perpendicular to the parallelopiped longitudinal edges and adapted to partially surround an insulated electrical conductor to cut the insulation thereon, the improvement comprising:
an alignment reference formed on at least one longitudinal edge, the alignment reference being formed as a corner across the longitudinal edge created by the intersection of the longitudinal edge with a first generally flat surface that extends from the longitudinal edge toward the parallelopiped interior.

19. The improvement of claim 18 wherein the plane of the first surface intersects the cutting blade longitudinal edge at an angle of approximately 90 degrees.

20. The improvement of claim 18 wherein a second generally flat surface extends between the first surface and the longitudinal edge to thereby produce a generally V-shaped notch in the blade longitudinal edge.

21. The improvement of claim 20 wherein the plane of the first surface intersects the cutting blade longitudinal edge at a substantially right angle to form a sharp first corner and the plane of the second leg intersects the cutting blade longitudinal edge at an angle of less than approximately 45 degrees to form a relatively blunt second corner and thereby provide easy visual distinction between the first and second corners.

22. The improvement of claim 19 wherein the plane of the first surface is coincident with the radius cutting edge transverse center line.

23. The improvement of claim 20 wherein the second surface extends between the first surface and the longitudinal edge in the direction of the cutting blade leading end.

24. The improvement of claim 20 wherein the second surface extends between the first surface and the longitudinal edge in the direction of the cutting blade shank end.

25. The improvement of claim 19 wherein:
a. a first surface is formed on both longitudinal edges of the cutting blade; and
b. the first surfaces intersecting the respective longitudinal edges are co-planar.

26. The improvement of claim 25 wherein the plane of the first surfaces is coincident with the transverse center line of the radius cutting edge.

27. The improvement of claim 21 wherein the plane of the second leg intersects the cutting blade longitudinal edge at an angle of approximately 10 degrees.

* * * * *